United States Patent [19]

Jurisch

[11] 3,965,082
[45] June 22, 1976

[54] COMPOSITIONS OF POLYSTYRENE REACTED WITH HEXAMETHOXYMETHYLMELAMINE

[75] Inventor: Louis A. Jurisch, Morengo, Ill.

[73] Assignee: Commercial Solvents Corporation, Terre Haute, Ind.

[22] Filed: Sept. 2, 1975

[21] Appl. No.: 609,340

Related U.S. Application Data

[62] Division of Ser. No. 406,760, Oct. 15, 1973, Pat. No. 3,929,748.

[52] U.S. Cl. ................................. 526/19; 526/50; 526/204; 526/229; 526/346
[51] Int. Cl.² ..................................... C08F 112/08
[58] Field of Search ................... 260/88.1 P, 88.2 C, 260/88.2 S, 93.5 A

[56] References Cited
UNITED STATES PATENTS 3,714,114   1/1973   Stretanski .................. 260/45.8 NT Primary Examiner—Paul R. Michl
Attorney, Agent, or Firm—Robert H. Dewey; Howard E. Post

[57]            ABSTRACT

An improved process for emulsion polymerization by using as the initiator and the surfactant an oxazoline corresponding to the formula:

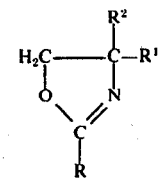

where R is an alkyl group of 1–19 carbons, and $R^1$ and $R^2$ are methyl, ethyl, hydroxymethyl, or the group $RCH_2COOCH_2-$.

4 Claims, No Drawings

COMPOSITIONS OF POLYSTYRENE REACTED WITH HEXAMETHOXYMETHYLMELAMINE

This is a division, of application Ser. No. 406,760, filed Oct. 15, 1973 now U.S. Pat. No. 3,929,748.

BACKGROUND OF THE INVENTION

This invention relates to a process for the production of polymers. In a particular aspect it relates to improved process for the production of polymers either by emulsion polymerization or by solution polymerization.

Polymerization processes generally employ a chain transfer agent which functions in such a manner as to promote polymer macro-molecules of relatively consistent chain length. A widely used chain transfer agent is n-dodecylmercaptan. This compound is, however, highly malodorous and is objectionable in the environment of the work room.

SUMMARY OF THE INVENTION

It is an object of this invention to provide an improved process for the production of polymers.

It is another object of this invention to provide an improved process for the production of polymers by conducting the polymerization in the presence of a chain transfer agent.

It is a third object of this invention to provide an improved process for the production of novel polymers.

Other objects will be apparent to those skilled in the art from the disclosure herein.

It is the discovery of the present invention to provide an improved process for the production of polymers and copolymers by emulsion or solution polymerization by effecting said polymerization in the presence of an oxazoline chain transfer agent corresponding to the formula:

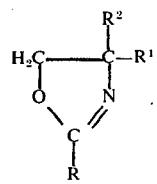

wherein R is an alkyl group of 1–19 carbon atoms and $R^1$ and $R^2$ are hydrogen, methyl, ethyl, hydroxymethyl or the group $RCH_2COOCH_2-$. $R^1$ and $R^2$ can be the same or different.

DETAILED DISCUSSION

In the practice of the present invention, an oxazoline corresponding to the above formula is incorporated in the polymerization mixture in an amount of about 0.1 to about 20 percent based on the weight of the monomers. Generally about 10–15 percent is preferred. No other chain transfer agent is employed, but various other additives known in the art, such as initiators, can be used as desired.

The use of an oxazoline as the chain transfer agent has the advantage of eliminating disagreeable odors in the work room.

In one embodiment of the present invention, polystyrene prepared in the presence of an oxazoline wherein at least one of $R^1$ or $R^2$ is hydroxymethyl is further reactable, e.g. with hexamethoxymethylmelamine or urea-formaldehyde. The resinous compound so obtained has utility as a protective coating. It produces a hard, light-colored but flexible film when laid down from a volatile solvent.

The oxazolines suitable for use in the present invention are known in the art, and many of them are commercially available. The usual commercial materials are satisfactory. These oxazolines can also be prepared by the method of Purcell, U.S. Pat. No. 3,336,145, which is incorporated herein by reference thereto.

The invention will be better understood with reference to the following examples. It is understood, however, that the examples are intended for illustration only and it is not intended that the invention be limited thereby.

EXAMPLE 1

A mixture of oxazolines was prepared by reacting pelargonic acid with tris(hydroxymethyl)aminomethane in a 1.5:1 mole ratio. A 50 g portion of the mixture was dispersed in 500 g distilled water containing 10 g hydroxyethyl cellulose. This mixture was heated to reflux for 15 minutes, then allowed to cool to 180°F. There was gradually added in about an hour with stirring 350 g of styrene and simultaneously 2 g ammonium persulfate dissolved in 20 g distilled water. Heating at 180°F was continued for another 30 minutes and it was then allowed to cool. A stable, white latex was obtained.

A sample of the latex was laid down on a smooth substrate and dried at room temperature. A rough film was obtained. When baked at 400°F for 5 minutes, a clear, very hard but reasonably flexible film was obtained.

A sample of the latex was mixed with hexamethoxymethyl melamine, laid down on a smooth substrate and baked at 400°F for 10 minutes. An ultra-hard opaque film was formed. It was immersed in water for an hour at room temperature and barely softened. Another sample of the baked film was heated at 400°F for 4 hours. No discloration occurred and it retained a hardness of $6H^+$ on aluminum and passed a ⅛ inch mandrel bend. When tested for solvent resistance, it passed 100 rubs with methyl ethyl ketone.

EXAMPLE 2

The foregoing experiment was repeated in all essential details except that methylated melamine (Resimene X-740 manufactured by Monsanto Chemical Company was used) was substituted for hexamethoxymethyl melamine. Similar results were obtained.

EXAMPLE 3

The experiment of Example 1 was repeated in all essential details except that vinyl acetate monomer was substituted for styrene at a temperature of 150°F. During the mixing the temperature rose to 185° where it was maintained for 30 minutes. A sample laid down on a substrate dried tack-free in 3 minutes.

EXAMPLE 4

A mixture of oxazolines was prepared by reacting isononanoic acid, 1.5 moles with tris(hydroxymethyl)aminomethane, 1 mole.

A 75 g portion of this oxazoline was dispersed in a mixture of styrene 500 g, methacrylic acid 75 g, and 70 percent benzoyl peroxide 20 g. This solution was added dropwise with stirring over a period of 1 hour to 300 g of 2-butoxy-1-ethanol at a temperature of 340°F. Heating was continued 1 hour, then the solution was cooled to 175°C. To this mixture was added 95 percent 2-amino-2-methyl-1-propanol 100 g to neutralize the acid. The mixture was then allowed to cool to room temperature. The product was clear, semi-solid having a viscosity of about Z, Gardner; a color, Gardner of 1 and non-volatile content of 70 percent.

To the product obtained above was added hexamethoxymethyl hexamethylene triamine 30 percent to give a white, waterreducible dispersion.

A sample was drawn down on a smooth substrate and baked at 400°F for 10 minutes; there was obtained a clear, hard film with high gloss, free from discoloration and possessed good flexibility.

I claim:

1. A resinous compound prepared by polymerizing styrene in the presence of ammonium persulfate and an oxazoline corresponding to the formula:

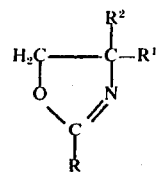

wherein $R^1$ and $R^2$ are hydrogen, methyl, ethyl, hydroxymethyl or the group $RCOOCH_2$- and at least one of $R^1$ or $R^2$ is hydroxymethyl, and where R is an alkyl group of 1 to 19 carbons and further reacting said resinous compound with hexamethoxymethylmelamine at 400°F.

2. The resinous compound of claim 1 wherein $R^1$ and $R^2$ are hydroxymethyl.

3. The resinous compound of claim 1 wherein $R^1$ is hydroxymethyl and $R^2$ is methyl.

4. The polymerization product of claim 1 wherein $R^1$ is hydroxymethyl and $R^2$ is ethyl.

* * * * *

UNITED STATES PATENT OFFICE
CERTIFICATE OF CORRECTION

Patent No. 3,965,082          Dated June 22, 1977

Inventor(s) Louis A. Jurisch

It is certified that error appears in the above-identified patent and that said Letters Patent are hereby corrected as shown below:

Column 4, claim 1, line 14, "resinous compound" should read
-- polymerization product --.

Column 4, claim 4, line 20, "polymerization product" should
read -- resinous compound --.

Signed and Sealed this twenty-third Day of August 1977

[SEAL]

Attest:

RUTH C. MASON
Attesting Officer

C. MARSHALL DANN
Commissioner of Patents and Trademarks